United States Patent [19]

Uchida et al.

[11] Patent Number: 5,164,425
[45] Date of Patent: Nov. 17, 1992

[54] ARTIFICIAL MARBLE COMPOSITION

[75] Inventors: Hiroshi Uchida; Masato Kaneda, both of Oita; Mikito Kitayama, Yokohama, all of Japan

[73] Assignee: Showa Denko K.K., Tokyo, Japan

[21] Appl. No.: 637,237

[22] Filed: Jan. 3, 1991

[51] Int. Cl.$^5$ .............................................. C08K 3/36
[52] U.S. Cl. .................................. 523/171; 523/513; 523/514; 524/513
[58] Field of Search .................. 523/171, 513, 514; 524/513

[56] References Cited

U.S. PATENT DOCUMENTS

| | | | |
|---|---|---|---|
| 3,441,535 | 4/1969 | Beacham et al. | 523/171 |
| 4,544,584 | 10/1985 | Ross et al. | 428/15 |
| 4,771,095 | 9/1988 | Hanisch et al. | 524/437 |
| 4,916,172 | 4/1990 | Hayashi et al. | 523/171 |
| 4,959,451 | 9/1990 | Uchida et al. | 528/272 |

FOREIGN PATENT DOCUMENTS

| | | |
|---|---|---|
| 58-4611 | 1/1983 | Japan . |
| 59-33308 | 2/1984 | Japan . |
| 59-66426 | 4/1984 | Japan . |
| 60-245609 | 12/1985 | Japan . |
| 61-101552 | 5/1986 | Japan . |

Primary Examiner—Paul R. Michl
Assistant Examiner—Edward J. Cain
Attorney, Agent, or Firm—Sughrue, Mion, Zinn, Macpeak & Seas

[57] ABSTRACT

A composition for artificial marble comprising (a) 10 to 60% by weight of an allyl-terminated oligomer, (b) 40 to 86% by weight of an inorganic filler and (c) 0 to 30% by weight of a reactive monomer. The composition provides artificial marble having a deep appearance characteristic of marble and having a high strength and high abrasion resistance.

24 Claims, No Drawings

ARTIFICIAL MARBLE COMPOSITION

BACKGROUND OF THE INVENTION

(1) Field of the Invention

The present invention relates to a composition for artificial marble having a deep appearance characteristic of marble and having a high strength and high abrasion resistance.

(2) Description of the Related Art

Artificial marble has been heretofore used as sanitary wares such as a washing stand, a bathtub and a kitchen counter, or as construction materials such an interior decorative material and an exterior decorative material.

For the production of artificial marble in the form of a resin molded article, there is adopted a cast molding method comprising incorporating, for example, an inorganic filler or a fibrous filler into a matrix resin constituting artificial marble, kneading the mixture, and filling and curing the kneaded composition in a mold. There also is adopted a molding method in which SMC (sheet molding compound) formed by impregnating a glass fiber or the like with a resin composition having an inorganic filler or other bulking agent incorporated therein and wrapping both the surfaces with a film or BMC (bulk molding compound) similarly prepared in the form of a bulk is compression-molded.

An unsaturated polyester resin and an epoxy resin are generally used as the matrix resin, but artificial marbles prepared by using these matrix resins not entirely satisfactory in appearance. For example, artificial marble prepared by using an unsaturated polyester resin as the matrix is defective in that since the transparency is insufficient, a deep appearance based on the transparency, which is characteristic of marble, cannot be obtained. A technique of overcoming this defect is proposed, for example, in Japanese Unexamined Patent Publication No. 59-66426 or Japanese Unexamined Patent Publication No. 61-101552.

Moreover, a product obtained by using an unsaturated polyester resin as the matrix is defective in that, since the scratch resistance of the surface is insufficient, a gel coating agent must be used.

The trend in the uses of artificial marble toward an increase of the quality is strong at the present, and the attainment of a pleasing appearance having a pattern deep in the interior of the molded article, which is due to a high transparency, and an improvement of the mechanical properties such as flexural strength and impact resistance, surface strength and mechanical strength, are desired. Therefore, a methacrylic resin having a good transparency and mechanical strength has attracted attention as the matrix resin, and many proposals have been made for an artificial marble composition or artificial marble comprising a methacrylic resin as the matrix, and many inventions characterized by the combined use of a methacrylic resin with a specific filler have been published. For example, there can be mentioned a method in which aluminum hydroxide is added (see Japanese Examined Patent Publication No. 50-22586 and Japanese Examined Patent Publication No. 55-43422), a method in which silica is added (Japanese Unexamined Patent Publication No. 58-4611), and a method in which calcium silicate is added (Japanese Unexamined Patent Publication No. 59-33308).

Furthermore, there is disclosed a composition of a methacrylic acid type resin having a filler incorporated therein, in which the flowability at the molding step is improved (Japanese Unexamined Patent Publication No. 60-245609).

As seen from the foregoing description, a methacrylic resin is now used as the matrix resin more frequently than the heretofore used unsaturated polyester resin or epoxy resin.

Also, as pointed out above, if a resin having an excellent transparency is used as the matrix for artificial marble, a deep and pleasing appearance can be given to the molded artificial marble. Therefore, it is generally considered that a methacrylic resin is preferably used as the matrix resin. The methacrylic resin however, is far different from a filler in various properties, and especially, because of differences of interfacial characteristics, the methacrylic resin has a poor affinity and adhesiveness to the filler. Moreover, when the filler is incorporated into the resin, the viscosity increases with the incorporation of the filler, and it becomes extremely difficult to disperse the filler uniformly in the resin. Accordingly, it is difficult to improve the characteristics of artificial marble and reduce the cost by increasing the amount of the filler.

For the foregoing reason, the obtained artificial marbles involves a problem in that the mechanical strength characteristics such as the flexural strength and impact resistance are not practically satisfactory. To overcome this defect, artificial marble formed by incorporating into a resin a filler having the surface treated with a silane coupling agent is proposed, but a satisfactory improvement cannot be attained by this proposal. Moreover, an increase of the manufacturing cost cannot be avoided.

Moreover, the methacrylic resin is fatally defective in that the resistance to boiling water is low and the artificial marble composition cannot be used for a bathtub and the like.

SUMMARY OF THE INVENTION

The inventors carried out research with a view to overcoming the defects of resins customarily used as the matrix for artificial marble, and as a result found that, if a polymerizable oligomer having an allyl group, which is represented by a specific structural formula, is used as the matrix resin constituting artificial marble, there can be obtained an artificial marble molded article having an excellent mechanical characteristic such as the flexural strength and impact strength, and having a high surface hardness, and in which because of a high transparency, a pleasing appearance having a pattern deep in the interior of the molded article can be produced.

More specifically, in accordance with the present invention, there is provided a composition for artificial marble comprising (a) 10 to 60% by weight of an allyl-terminated oligomer, (b) 40 to 86% by weight of an inorganic filler and (c) 0 to 30% by weight of a reactive monomer.

DESCRIPTION OF THE PREFERRED EMBODIMENTS

The allyl group-containing polymerizable oligomer represented by the specific structural formula, which is incorporated in the composition of the present invention, is at least one allyl-terminated oligomer selected from the group consisting of (1) oligomers represented by the following formula:

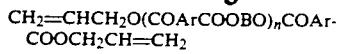

wherein B represents a divalent organic residue derived from a diol having 2 to 20 carbon atoms, Ar represents a 1,4-, 1,3- or 1,2-phenylene group, and n is an integer of from 1 to 100, which have an unsaturation degree of 20 to 100 expressed as the iodine value measured by the Wijs method, and (2) oligomers having a terminal allyl ester group and having recurring units of (COArCOOBO) (structure I) and (COArCOO)$_x$Z—O—COArCOO— (structure II) in which x is an integer of from 2 to 10, Z represents an organic residue derived from a polyol having (x+1) of hydroxyl groups, B represents a divalent organic residue derived from a diol having 2 to 20 carbon atoms and Ar represents a 1,4-, 1,3- or 1,2-phenylene group, which have an unsaturation degree of 20 to 100 expressed as the iodine value measured by the Wijs method.

As the diol having 2 to 20 carbon atoms, from which B is derived, there can be mentioned aliphatic diols and aromatic ring-containing diols, such as ethylene glycol, 1,2-propylene glycol, 1,4-butanediol, 1,6-hexanediol, 1,4-cyclohexane dimethanol, 1,3-butanediol, neopentyl glycol, 1,3-cyclohexane diol, p-xylylene glycol and styrene glycol.

As the polyol having (x+1) of hydroxyl groups, from which Z is derived, there can be mentioned aliphatic trihydric alcohols such as glycerol and trimethylol propane, and aliphatic tetravalent and higher alcohols such as pentaerythritol and sorbitol.

The oligomer can be synthesized according to a process as disclosed in Japanese Patent Application No. 63-262217.

As B, one having a side chain attached to the position of the hydroxyl group is preferred because it gives a liquid polymerizable oligomer having an excellent transparency.

If the amount incorporated of the polymerizable oligomer is too large, the appearance of artificial marble as the molded article is poor, and the intended feeling cannot be obtained. If the amount of the polymerizable oligomer is too small, the dispersibility of the inorganic filler is drastically degraded. Accordingly, the polymerizable oligomer should be used practically in an amount of 10 to 60% by weight, preferably 15 to 50% by weight.

Other reactive monomers can be added, to improve the polymerizability or surface hardness.

As the reactive monomer, there can be used, for example, an unsaturated fatty acid ester, an aromatic vinyl compound, an unsaturated fatty acid, a derivative thereof, an unsaturated dibasic acid, a derivative thereof, a vinyl ester of a saturated fatty acid or aromatic carboxylic acid, a derivative thereof, and a vinyl cyanide compound such as (meth)acrylonitrile. As the unsaturated fatty acid ester, there can be mentioned alkyl (meth)acrylates such as methyl (meth)acrylate, ethyl (meth)acrylate, butyl (meth)acrylate, 2-ethylhexyl (meth)acrylate, octyl (meth)acrylate, dodecyl (meth)acrylate, octadecyl (meth)acrylate, cyclohexyl (meth)acrylate, methylcyclohexyl (meth)acrylate, (iso)bornyl (meth)acrylate and adamantyl (meth)acrylate, aromatic esters of (meth)acrylic acid such as phenyl (meth)acrylate, benzyl (meth)acrylate, fluorophenyl (meth)acrylate, chlorophenyl (meth)acrylate, bromophenyl (meth)acrylate, tribromophenyl (meth)acrylate, methoxyphenyl (meth)acrylate, cyanophenyl (meth)acrylate, biphenyl (meth)acrylate and bromobenzyl (meth)acrylate, haloalkyl (meth)acrylates such as fluoromethyl (meth)acrylate, chloromethyl (meth)acrylate, bromoethyl (meth)acrylate and trichloromethyl (meth)acrylate, 2-hydroxyethyl (meth)acrylate, polyethylene glycol esters of (meth)acrylic acid, and esters of (meth)acrylic acid such as glycidyl (meth)acrylate and an alkylamino (meth)acrylate. Furthermore, there can be mentioned α-substituted acrylic acid esters such as an α-fluoroacrylic acid ester and an α-cyanoacrylic acid ester.

As the aromatic vinyl compound, there can be mentioned styrene, α-substituted styrenes such as α-methylstyrene, α-ethylstyrene and α-chlorostyrene, and nucleus-substituted styrenes such as fluorostyrene, chlorostyrene, bromostyrene, chloromethylstyrene and methoxystyrene.

As the unsaturated fatty acid and its derivative, there can be mentioned (meth)acrylamides such as (meth)acrylamide, N,N-dimethyl(meth)acrylamide and N,N-diethyl(meth)acrylamide, and (meth)acrylic acid.

As the unsaturated dibasic acid and its derivative, there can be mentioned N-substituted maleimides such as N-methylmaleimide, N-ethylmaleimide, N-butylmaleimide, N-cyclohexylmaleimide, N-phenylmaleimide, N-methylphenylmaleimide, N-chlorophenylmaleimide and N-carboxyphenylmaleimide, maleic acid, maleic anhydride and fumaric acid.

As the vinyl ester of a saturated fatty acid or aromatic carboxylic acid and its derivative, there can be mentioned vinyl acetate, vinyl propionate, vinyl benzoate and vinyl n-butyrate.

Moreover, a crosslinkable polyfunctional monomer can be used. For example, there can be mentioned di(meth)acrylates such as ethylene glycol di(meth)acrylate, diethylene glycol di(meth)acrylate, triethylene glycol di(meth)acrylate, tetraethylene glycol di(meth)acrylate, tripropylene glycol di(meth)acrylate, 1,3-butylene glycol di(meth)acrylate, 1,4-butanediol di(meth)acrylate, 1,5-pentanediol di(meth)acrylate, 1,6-hexanediol di(meth)acrylate neopentyl glycol di(meth)acrylate, neopentyl glycol pivalate di(meth)acrylate, oligoester di(meth)acrylate, polybutadiene di(meth)acrylate, 2,2-bis(4-(meth)-acryloyloxyphenyl)propane, 2,2-bis(4-ω-(meth)-acryloyloxypolyethoxyphenyl)propane, 2,2-bis(4-ω-(meth)-acryloyloxypolyethoxydibromophenyl)propane, 2,2-bis-(4-ω-(meth)acryloyloxypolypropoxyphenyl)propane and bis(4-ω-(meth)acryloyloxypolyethoxyphenyl)propane, bifunctional crosslinkable monomers such as diallyl phthalate, diallyl isophthalate, diallyl terephthalate, diallyl carbonate, diethylene glycol diallyl carbonate, divinylbenzene and N,N'-m-phenylene bismaleimide, trifunctional crosslinkable monomers such as trimethylolethane tri(meth)acrylate, trimethylolpropane tri(meth)acrylate, pentaerythritol tri(meth)acrylate, tri(meth)allyl isocyanurate, tri(meth)allyl cyanurate, triallyl trimellitate and diallyl chlorendate, and tetrafunctional crosslinkable monomers such as pentaerythritol tetra(meth)acrylate.

In view of the copolymerizability with the allyl group of the polymerizable oligomer, aromatic allyl esters such as diallyl phthalate, diallyl isophthalate and diallyl terephthalate, (meth)acrylic acid esters and vinyl acetate are preferably used. To increase the surface hardness, it is preferred that a crosslinkable polyfunctional monomer be added.

The amount incorporated of the reactive monomer is up to 30% by weight, preferably up to 20% by weight, based on the composition of the present invention. If the amount incorporated of the reactive monomer exceeds 30% by weight, by disadvantageous reduction of the curing speed and increase of the curing percent shrinkage, the internal strain of the molded article is conspicuously increased and good results cannot be obtained.

As the inorganic filler to be incorporated into the artificial marble composition of the present invention, there can be used, for example, fine particles of silica, quartz, titanium oxide, antimony trioxide, aluminum oxide, calcium carbonate, aluminum hydroxide, magnesium hydroxide, talc, clay and metals. Among them, aluminum hydroxide and magnesium hydroxide are preferably used because they improve the flame retardancy of artificial marble as the molded article.

The particle size of the fine particles is 1 to 50 $\mu$m, preferably 10 to 30 $\mu$m when the molding is performed according to the cast molding method. In the case where the molding is accomplished by the compression molding of SMC or BMC, the optimum particle size is different from the case of the cast molding, and an artificial marble cured product having a very excellent gloss can be obtained by using an inorganic filler at least 50% by weight, preferably at least 70% by weight of which has a particle size smaller than 30 $\mu$m, especially smaller than 10 $\mu$m. In this case, if the inorganic filler is used in an amount larger than in the cast molding, cracking can be prevented at the curing step. In this case, the optimum amount of the inorganic filler is at least 65% by weight, especially at least 75% by weight. In the cast molding method, the reactive monomer, which can be ordinarily used in a large amount for adjusting the viscosity, curability and refractive index, is not preferable because the percent shrinkage increases, but if the reactive monomer is not used at all, a generation of heat under shearing becomes conspicuous at the step of kneading by a kneader or the like, and an incorporation of an initiator becomes impossible. Therefore, the reactive monomer must be used in an amount of 0.1 to 15% by weight, preferably 1 to 10% by weight.

The foregoing inorganic fillers can be used alone or in the form of a mixture of two or more thereof. To improve the dispersibility and adhesion of the inorganic filler, a surface-treated inorganic filler can be used.

The artificial marble composition of the present invention can be molded into artificial marble by polymerization and curing.

Any of radical polymerization initiators capable of forming radicals under an irradiation with heat, micro waves, infrared rays or ultraviolet rays can be used as the curing agent in the present invention, and an appropriate curing agent is selected and used according to the use, object and component mixing ratio of the curable composition and the curing method adopted for the curable composition.

As the radical polymerization initiator capable of generating radicals under irradiation with heat, micro waves or infrared rays, that can be used in the present invention, there can be mentioned, for example, azo compounds such as 2,2'-azobisisobutyronitrile, 2,2'-azobisisovaleronitrile and 2,2'-azobis(2,4-dimethylvaleronitrile), ketone peroxides such as methylethylketone peroxide, methylisobutylketone peroxide, cyclohexane peroxide and acetylacetone peroxide, diacyl peroxides such as isobutyryl peroxide, benzoyl peroxide, 2,4-dichlorobenzoyl peroxide, o-methylbenzoyl peroxide, lauroyl peroxide and p-chlorobenzoyl peroxide, hydroperoxides such as 2,4,4-trimethylpentyl-2-hydroxyperoxide, diisopropylbenzene peroxide, cumene hydroperoxide and t-butyl peroxide, dialkyl peroxides such as dicumyl peroxide, t-butylcumyl peroxide, di-t-butyl peroxide and tris(t-butylperoxy)triazine, peroxyketals such as 1,1-di-t-butylperoxycyclohexane and 2,2-di(t-butylperoxy)butane, alkyl peresters such as t-butylperoxy pivalate, t-butylperoxy-2-ethyl hexanoate, t-butylperoxy isobutyrate, di-t-butylperoxy hexahydrophthalate, di-t-butylperoxy azelate, t-butylperoxy-3,5,5-trimethyl hexanoate, t-butyl peroxyacetate, t-butyl peroxybenzoate and di-t-butylperoxytrimethyl adipate, percarbonates such as diisopropyl peroxydicarbonate, di-sec-butyl peroxydicarbonate and t-butylperoxyisopropyl carbonate.

As the polymerization initiator that can be used for the polymerization under ultraviolet rays, there can be mentioned carbonyl compounds such as acetophenone, 2,2-dimethoxy-2-phenylacetophenone, 2,2-diethoxyacetophenone, 4'-isopropyl-2-hydroxy-2-methylpropiophenone, 2-hydroxy-2-methylpropiophenone, 4,4'-bis-(diethylamino)benzophenone, benzophenone, methyl-(o-benzoyl) benzoate, 1-phenyl-1,2-propanedione-2-(o-ethoxycarbonyl)oxime, 1-phenyl-1,2-propanedione-2-(o-benzoyl)oxime, benzoin, benzoin methyl ether, benzoin ethyl ether, benzoin isopropyl ether, benzoin isobutyl ether, benzoin isooctyl ether, benzil, benzil diethyl ketal and diacetyl, anthraquinone and xanthone compounds such as methylanthraquinone, chloroanthraquinone, 2-methylthioxanthone and 2-isopropylthioxanthone, and sulfur compounds such as diphenyl sulfide and dithiocarbamate.

It is preferred that the polymerization initiator be used in an amount of 0.1 to 10 parts by weight, especially 0.5 to 2 parts by weight, based on the polymerizable oligomer.

Known other additives, for example, a plasticizer, a lubricant, a parting agent, a colorant, a flame retardant and an ultraviolet absorber can be incorporated into the artificial marble composition of the present invention according to need.

The foregoing components are mixed and thoroughly stirred to obtain a homogeneous composition of the present invention. The obtained composition is cast in a casting mold having a desired shape, deaerated and heated to effect polymerization and curing and obtained a molded article. Furthermore, SMC or BMC formed by wrapping the homogeneous composition with a film in the form of a sheet or bulk is compression-molded according to conventional molding procedures to effect curing and obtain a molded article.

According to the present invention, by using a polymerizable oligomer as the resin constituting the matrix of artificial marble, the poor boiling resistance, which is a fatal defect of the methacrylic resin, is highly improved and an artificial marble that can be used for a bathtub can be provided.

Moreover, the scratch resistance of the molded article of the present invention is much higher than that of a molded article prepared by using an unsaturated polyester resin, and use of a gel coating agent becomes unnecessary. Still further, a high-grade profound appearance can be imparted to the molded article and the thermal shock characteristics are highly improved.

The present invention will now be described in detail with reference to the following examples.

REFERENTIAL EXAMPLE 1

A three-neck flask having a capacity of 1 liter and equipped with a distilling device was charged with 600 g of diallyl terephthalate (abbreviated to "DAT" hereinafter), 92.7 g of propylene glycol and 0.3 g of dibutyl tin oxide, and the mixture was heated at 180° C. in a nitrogen current. Formed allyl alcohol was removed by distillation. When about 110 g of allyl alcohol was distilled, the pressure in the reaction system was reduced to 50 mmHg to increase the distillation speed of allyl alcohol. After the stoichiometric amount of allyl alcohol was distilled, heating was further conducted for 1 hour. Then, the pressure was reduced, and remaining allyl alcohol and unreacted DAT monomer were removed by distillation to obtain 506 g of a polymerizable oligomer.

REFERENTIAL EXAMPLE 2

A three-neck flask having a capacity of 1 liter and equipped with a distilling device was charged with 600 g of DAT, 109.8 g of 1,3-butanediol and 0.3 g of dibutyl tin oxide, and the mixture was heated at 180° C. in a nitrogen current. Formed allyl alcohol was removed by distillation. When about 120 g of allyl alcohol was distilled, the pressure in the reaction system was reduced to 50 mmHg to increase the distillation speed of allyl alcohol. After the stoichiometric amount of allyl alcohol was distilled, heating was further conducted for 1 hour. Then, the pressure was reduced, and remaining allyl alcohol and unreacted DAT monomer were removed by distillation to obtain 570 g of a polymerizable oligomer.

REFERENTIAL EXAMPLE 3 (PREPARATION OF POLYMERIZABLE OLIGOMER)

A three-neck flask having a capacity of 1 liter and equipped with a distilling device was charged with 600 g of diallyl isophthalate (abbreviated to "DAI" hereinafter), 92.7 g of propylene glycol and 0.3 g of dibutyl tin oxide, and the mixture was heated at 180° C. in a nitrogen current. Formed allyl alcohol was removed by distillation. When about 120 g of allyl alcohol was distilled, the pressure in the reaction system was reduced to 50 mmHg to increase the distillation speed of allyl alcohol. After the stoichiometric amount of allyl alcohol was distilled, heating was further conducted for 1 hour. Then, the pressure was reduced and remaining allyl alcohol and unreacted diallyl is phthalate monomer were removed by distillation to obtain 523 g of a polymerizable oligomer.

REFERENTIAL EXAMPLE 4(PREPARATION OF POLYMERIZABLE OLIGOMER)

A three-neck flask having a capacity of 1 liter and equipped with a distilling device was charged with 600 g of DAT, 92.7 g of propylene glycol and 0.3 g of dibutyl tin oxide, and the mixture was heated at 180° C. in a nitrogen current. Formed allyl alcohol was removed by distillation. When about 120 g of allyl alcohol was distilled, the pressure in the reaction system was reduced to 50 mmHg to increase the distillation speed of allyl alcohol. After the stoichiometric amount of allyl alcohol was distilled, heating was further conducted for 1 hour. Then, the pressure was reduced and remaining allyl alcohol and unreacted DAT monomer were removed by distillation to obtain 523 g of a polymerizable oligomer.

REFERENTIAL EXAMPLE 5 (PREPARATION OF POLYMERIZABLE OLIGOMER)

A three-neck flask having a capacity of 2 liters and equipped with a distilling device was charged with 1500 g of DAT, 41.5 g of 1,3-butane diol, 138.2 g of pentaerythritol and 1.5 g of dibutyl tin oxide, and the mixture was heated at 180° C. in a nitrogen current. Formed allyl alcohol was removed by distillation. When about 300 g of allyl alcohol was distilled, the pressure in the reaction system was reduced to 50 mmHg to increase the distillation speed of allyl alcohol. After the stoichiometric amount of allyl alcohol was distilled, heating was further conducted for 1 hour. Then, the pressure was reduced and remaining allyl alcohol was removed by distillation to obtain 1345 g of a polymerizable oligomer.

REFERENTIAL EXAMPLE 6

A three-neck flask having a capacity of 2 liters and equipped with a distilling device was charged with 1500 g of DAT, 115.9 g of propylene glycol, 103.7 g of pentaerythritol and 1.5 g of dibutyl tin oxide, and the mixture was heated at 180° C. in a nitrogen current. Formed allyl alcohol was removed by distillation. When about 350 g of allyl alcohol was distilled, the pressure in the reaction system was reduced to 50 mmHg to increase the distillation speed of allyl alcohol. After the stoichiometric amount of allyl alcohol was distilled, heating was further conducted for 1 hour. Then, the pressure was reduced and remaining allyl alcohol was removed by distillation to obtain 1330 g of a polymerizable oligomer.

REFERENTIAL EXAMPLE 7

A three-neck flask having a capacity of 2 liters and equipped with a distilling device was charged with 1500 g of DAI, 91.5 g of 1,3-butanediol, 138.2 g of pentaerythritol and 3.0 g of dibutyl tin oxide, and the mixture was heated at 180° C. in a nitrogen current. Formed allyl alcohol was removed by distillation. When about 300 g of allyl alcohol was distilled, the pressure in the reaction system was reduced to 50 mmHg to increase the distillation speed of allyl alcohol. After the stoichiometric amount of allyl alcohol was distilled, heating was further conducted for 1 hour. Then, the pressure was reduced and remaining allyl alcohol was removed by distillation to obtain 1325 g of a polymerizable oligomer.

The analysis values of the polymerizable oligomers obtained in Referential Examples 1 through 7 are shown in Table 1. Note, these polymerizable oligomers were used in the examples given hereinafter.

TABLE 1

| | Analysis Results of Polymerizable Oligomers | | | | |
|---|---|---|---|---|---|
| Referential Example No. | Residual Monomer Concentration (% by weight) | Iodine Value | Viscosity (cP) (at 30° C.) | GPC Molecular Weight | |
| | | | | Mn | Mw |
| 1 | 21.8 | 103.7 | 7000 | $9.90 \times 10^2$ | $1.67 \times 10^3$ |
| 2 | 20.1 | 101.6 | 6500 | $1.23 \times 10^3$ | $2.01 \times 10^3$ |

TABLE 1-continued

| | Analysis Results of Polymerizable Oligomers | | | | |
|---|---|---|---|---|---|
| Referential Example No. | Residual Monomer Concentration (% by weight) | Iodine Value | Viscosity (cP) (at 30° C.) | GPC Molecular Weight Mn | Mw |
| 3 | 12.6 | 76.9 | 715000 | $1.31 \times 10^3$ | $1.88 \times 10^3$ |
| 4 | 13.3 | 78.1 | 365000 | $1.23 \times 10^3$ | $1.92 \times 10^3$ |
| 5 | 23.6 | 117.9 | 872000 | $2.43 \times 10^3$ | $1.51 \times 10^4$ |
| 6 | 26.9 | 116.0 | 96000 | $1.79 \times 10^3$ | $5.79 \times 10^3$ |
| 7 | 26.4 | 113.8 | 560000 | $2.36 \times 10^3$ | $1.46 \times 10^4$ |

EXAMPLE 1

To 100 parts by weight of the polymerizable oligomer obtained in Referential Example 1 were added 100 parts by weight of roughly pulverized aluminum hydroxide (HIGILITE® H-100 supplied by Showa Denko) and 100 parts by weight of finely pulverized aluminum hydroxide (HIGILITE® H-320 supplied by Showa Denko), and the mixture was stirred to finely disperse the aluminum hydroxides. Then, 1 part by weight of dicumyl peroxide was further added and the mixture was stirred and deaerated under a reduced pressure to obtain a compound.

The obtained compound was cast in a metal mold having a diameter of 40 mm and a depth of 40 mm and heated and cured at 170° C. for 1 hour to obtain a marble-like molded article having a pleasing appearance and a hiding property, which properly diffused light.

With respect to the obtained molded article, the Hunter chromaticity was measured by a color difference meter, and the hardness was measured by a Rockwell hardness meter.

The results are shown in Table 2.

EXAMPLE 2

To 80 parts by weight of the polymerizable oligomer obtained in Referential Example 1 was added 20 parts by weight of DAT, and 200 parts by weight of finely divided aluminum hydroxide (HIGILITE® H-320 supplied by Showa Denko) was added to the obtained syrup and the mixture was stirred and uniformly dispersed. Then, 1 part by weight of dicumyl peroxide was further added, and the mixture was stirred and deaerated under a reduced pressure to obtain a compound.

The obtained compound was cast into a metal mold having a diameter of 40 mm and a depth of 40 mm and heated and cured at 170° C. for 1 hour to obtain a marble-like molded article having a pleasing appearance and a hiding property, which properly diffused light.

The chromaticity and hardness of the obtained molded article were measured in the same manner as described in Example 1. The results are shown in Table 2.

TABLE 2

| | Results of Measurement of Molded Articles | | | |
|---|---|---|---|---|
| Example No. | Hunter Chromaticity L | a | b | Rockwell Hardness (M scale) |
| 1 | 63.3 | −0.6 | 3.7 | 96 |
| 2 | 70.1 | −0.6 | 5.5 | 97 |

EXAMPLE 3

To 100 parts by weight of the polymerizable oligomer obtained in Referential Example 2 were added 100 parts by weight of roughly pulverized aluminum hydroxide (HIGILITE® H-100 supplied by Showa Denko) and 100 parts by weight of finely pulverized aluminum hydroxide (HIGILITE® H-320 supplied by Showa Denko), and the mixture was stirred to finely disperse the aluminum hydroxides. Then, 1 part by weight of dicumyl peroxide was further added and the mixture was stirred and deaerated under a reduced pressure to obtain a compound.

The obtained compound was cast in a metal mold having a diameter of 40 mm and a depth of 40 mm and heated and cured at 170° C. for 1 hour to obtain a marble-like molded article having a pleasing appearance and a hiding property, which properly diffused light.

EXAMPLE 4

To 100 parts by weight of the polymerizable oligomer obtained in Referential Example 4 were added 6 parts of an initiator (Perbutyl-O supplied by Nippon Yushi) and 3 parts by weight of zinc stearate, and they were stirred to obtain a homogeneous liquid mixture. The liquid mixture was charged in a twin-arm type kneader, and 400 parts by weight of finely divided aluminum hydroxide having an average particle size of 10 μm (HIGILITE® H-320 supplied by Showa Denko) was charged into the kneader with stirring and 35 parts by weight of a glass fiber (06IFN80 supplied by Asahi Fiber Glass) was further charged. The mixture was sufficiently kneaded to obtain a white clay-like compound.

The obtained compound was compressed and cured at 120° C. for 10 minutes in a mold for forming a disk for measuring the molding shrinkage, specified in JIS K-6011, to obtain a marble-like molded article having an excellent gloss, a pleasing appearance and a hiding property.

With respect to the obtained molded article, the Hunter chromaticity was measured by a color difference meter and the hardness was measured by a Rockwell hardness meter. The results are shown in Table 3.

EXAMPLES 5 THROUGH 12

By using polymerizable oligomers, curing agents and inorganic fillers shown in Table 3, compounds were obtained by carrying out kneading in the same manner as described in Example 4. These compounds were cured and the physical properties were measured in the same manner as described in Example 4. The results are shown in Table 3.

TABLE 3

| | Referential Example No. | Example No. | | | | | | | | |
|---|---|---|---|---|---|---|---|---|---|---|
| | | 4 | 5 | 6 | 7 | 8 | 9 | 10 | 11 | 12 |
| Oligomer | 3 | | | 100 | | 20 | 100 | | | |
| | 4 | 100 | | | | | | 80 | | 95 |
| | 5 | | 100 | | | 30 | | | 90 | |
| | 6 | | | | | 50 | | | | |
| | 7 | | | | 100 | | | 20 | | |
| Methyl methacrylate monomer | | | | | | | | | 10 | 5 |
| Perbutyl-O | | 6 | | | 6 | 3 | | | | |
| Perhexa-C | | | 6 | | | • | 6 | 6 | 6 | 6 |
| Percumyl-D | | | | 6 | | 3 | | | | |
| Zinc stearate | | 3 | 3 | 3 | 3 | 3 | | | 6 | |
| HIGILITE ® H-320ST | | 400 | 400 | | | | 200 | 300 | | 460 |
| HIGILITE ® HS-320ST | | | | 400 | | | | | | |
| HIGILITE ® H-341ST | | | | | 400 | | 200 | | | |
| Glass frit M-50-PS | | | | | | 400 | | 100 | 300 | |
| Glass fiber 06IFN80 | | 35 | 35 | 35 | 35 | 20 | 35 | 30 | 50 | 30 |
| Curing conditions | temperature (°C.) | 120 | 120 | 140 | 120 | 130 | 130 | 130 | 120 | 130 |
| | time (hours) | 10 | 10 | 10 | 10 | 10 | 10 | 10 | 10 | 10 |
| Hunter chromaticity | L | 45.7 | 51.6 | 51.7 | 55.7 | 63.6 | 53.4 | 49.3 | 65.3 | 43.3 |
| | a | −1.1 | −0.3 | −1.2 | −1.3 | −1.0 | −1.1 | −1.2 | −0.8 | −0.9 |
| | b | 2.6 | 2.2 | 3.9 | 1.2 | 0.9 | 1.9 | 1.1 | 0.6 | 2.3 |
| Rockwell hardness | | 112 | 113 | 112 | 112 | 116 | 111 | 113 | 113 | 110 |

Note
Perhexa-C: Polymerization initiator supplied by Nippon Yushi
Percumyl-D: polymerization initiator supplied by Nippon Yushi
HIGILITE ® HS-320ST: aluminum hydroxide having average particle size of 8 μm, supplied by Showa Denko
HIGILITE ® H-341ST: aluminum hydroxide having average particle size of 25 μm, supplied by Showa Denko
Glass frit M-50-PS: silica powder having average particle size of 10 μm, supplied by Nippon Ferro

We claim:

1. A composition for artificial marble comprising:
   (a) 10 to 60% by weight of an allyl-terminated oligomer selected from the group consisting of
      (1) oligomers represented by the following formula,

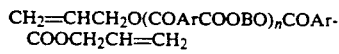

CH₂=CHCH₂O(COArCOOBO)ₙCOAr-COOCH₂CH=CH₂ wherein
      B represents a divalent organic residue derived from a diol having 2 to 20 carbon atoms,
      Ar represents a 1,4-, 1,3- or 1,2-phenylene group, and
      n is an integer of from 1 to 100, and
   (2) oligomers having a terminal allyl ester group and having recurring units of (COArCOOBO) and (COArCOO)ₓZ—O—COArCOO— in which
      X is an integer of from 2 to 10,
      Z represents an organic residue derived from a polyol having (x+1) hydroxyl groups,
      B represents a divalent organic residue derived from a diol having 2 to 20 carbon atoms, and
      Ar represents a 1,4-, 1,3- or 1,2-phenylene group
   (b) 40 to 86% by weight of an inorganic filler and
   (c) 0 to 30% by weight of a reactive monomer.

2. A composition as claimed in claim 1, wherein said allyl-terminated oligomer has an unsaturation degree of 20 to 100 expressed as the iodine value measured by the Wijs method.

3. A composition as claimed in claim 2, wherein said diol having 2 to 20 carbon atoms is selected from the group consisting of ethylene glycol, 1,2-propylene glycol, 1,4-butanediol, 1,6-hexanediol, 1,4-cyclohexane dimethanol, 1,3-butanediol, neopentyl glycol, 1,3-cyclohexane diol, p-xylyene glycol and styrene glycol.

4. A composition as claimed in claim 2, wherein said polyol having (x+1) of hydroxyl groups is selected from the group consisting of glycerol, trimethylol propane, pentaerythritol and sorbitol.

5. A composition as claimed in claim 2, wherein the amount of the allyl-terminated oligomer is 15 to 50% by weight.

6. A composition s claimed in claim 2, wherein said reactive monomer is selected from the group consisting of unsaturated fatty acid esters, aromatic vinyl compounds, unsaturated fatty acids and their derivatives, unsaturated dibasic acids and their derivatives, vinyl esters of saturated fatty acids or aromatic carboxylic acids and their derivatives, vinyl cyanide compounds, and crosslinkable polyfunctional monomers.

7. A composition as claimed in claim 6, wherein said unsaturated fatty acid esters are selected from the group consisting of alkyl (meth)acrylates and aromatic esters of (meth)acrylic acid; halo alkyl (meth)acrylates; 2)hydroxyethyl (meth)acrylate; polyethylene glycol esters of (meth)acrylic acid; esters of (meth)acrylic acid; and α-substituted acrylic acid esters.

8. A composition as claimed in claim 6, wherein said aromatic vinyl compounds are selected from the group consisting of styrene, α-substituted styrenes and nucleus-substituted styrenes.

9. A composition as claimed in claim 6, wherein unsaturated fatty acids and their derivatives are selected from the group consisting of (meth)acrylamides and (meth)acrylic acid.

10. A composition as claimed in claim 6, wherein said unsaturated dibasic acids and their derivatives are selected from the group consisting of N-substituted maleimides, maleic acid, maleic anhydride and fumaric acid.

11. A composition as claimed in claim 6, wherein said vinyl esters of a saturated fatty acid or aromatic carboxylic acid and their derivatives are selected from the group consisting of vinyl acetate, vinyl propionate, vinyl benzoate and vinyl n-butyrate.

12. A composition as claimed in claim 6, wherein said vinyl cyanide compound is (meth)acrylonitrile.

13. A composition as claimed in claim 6, wherein said crosslinkable polyfunctional monomers are selected from the group consisting of di(meth)acrylates, bifunctional crosslinkable monomers, trifunctional crosslinkable monomers, and tetrafunctional crosslinkable monomers.

14. A composition as claimed in claim 1, wherein the amount of the reactive monomer is 0 to 20% by weight.

15. A composition as claimed in claim 1, wherein said inorganic filler is selected from the group consisting of fine particles of silica, quartz, titanium oxide, antimony trioxide, aluminum oxide, calcium carbonate, aluminum hydroxide, magnesium hydroxide, talc, clay and metals.

16. A composition as claimed in claim 1, wherein said inorganic filler has a particle size of 1 to 50 μm where the composition is to be used for cast molding.

17. A composition as claimed in claim 1, wherein at least 50% by weight of said inorganic filler has a particle size smaller than 30 μm.

18. An artificial marble obtained by polymerizing and curing the artificial marble composition as claimed in claim 1.

19. A composition as claimed in claim 7, wherein said alkyl (meth)acrylates are selected from; the group consisting of methyl (meth)acrylate, ethyl (meth)acrylate, butyl (meth)acrylate, 2-ethylhexyl (meth)acrylate, octyl (meth)acrylate, dodecyl (meth)acrylate, octadecyl (meth)acrylate, cyclohexyl (meth)acrylate, methylcyclohexyl (meth)acrylate, (iso)bornyl (meth)acrylate and adamantyl (meth)acrylate; said aromatic esters of (meth)acrylic acid are selected from the group consisting of phenyl (meth)acrylate, benzyl (meth)acrylate, fluorophenyl (meth)acrylate, chlorophenyl (meth)acrylate, bromophenyl (meth)acrylate, tribromophenyl (meth)acrylate, methoxyphenyl (meth)acrylate, cyanophenyl (meth)acrylate, biphenyl (meth)acrylate and bromobenzyl (meth)acrylate; said haloalkyl (meth)acrylates are selected from the group consisting of fluoromethyl (meth)acrylate, chloromethyl (meth)acrylate, bromoethyl (meth)acrylate and trichloromethyl (meth)acrylate; said esters of (meth)acrylate acid are selected from the group consisting of glycidyl (meth)acrylate and an alkylamino (meth)acrylate; and said α-substituted acrylic acid esters are selected from the group consisting of an α-fluoroacrylic acid ester and an α-cyanoacrylic acid ester.

20. A composition as claimed in claim 8, wherein said α-substituted styrenes are selected from the group consisting of α-methylstyrene, α-ethylstyrene and α-chlorostyrene; and said nucleus-substituted styrenes are selected from the group consisting of fluorostyrene, chlorostyrene, bromostyrene, chloromethylstyrene and methoxystyrene.

21. A composition as claimed in claim 9, wherein said (meth)acrylamides are selected from the group consisting of (meth)acrylamide, N,N-dimethyl(meth)acrylamide and N,N-dimethyl(meth)acrylamide.

22. A composition as claimed in claim 10, wherein said N- substituted maleimides are selected from the group consisting of N-methylmaleimide, N-ethylmaleimide, N-butylmaleimide, N-cyclohexylmaleimide, N-phenylmaleimide, N-methylphenylmaleimide, N-chlorophenylmaleimide and N-carboxyphenylmaleimide.

23. A composition as claimed in claim 13, wherein said di(meth)acrylates are selected from the group consisting of ethylene glycol di(meth)acrylate, diethylene glycol di(meth)acrylate, triethylene glycol di(meth)acrylate, tetraethylene glycol di(meth)acrylate, tripropylene glycol di(meth)acrylate, 1,3-butylene glycol di(meth)acrylate, 1,4-butanediol di(meth)acrylate, 1,5-pentadiol di(meth)acrylate, 1,6-hexanediol di(meth)acrylate neopentyl glycol di(meth)acrylate, neopentyl glycol pivalate di(meth)acrylate, oligoester di(meth)acrylate, polybutadiene di(meth)acrylate, 2,2-bis(4-(meth)acryloyloxyphenyl)propane, 2,2-bis(4-ω-(meth)acryloyloxypolyethoxyphenyl)propane, 2,2-bis(4-ω-(meth)acryloyloxypolyethoxydibromophenyl)propane 2,2-bis(4-ω-(meth)acryloyloxypolyethoxyphenyl) propane; said bifunctional crosslinkable monomers are selected from the group consisting of diallyl phthalate, diallyl isophthalate, diallyl terephthalate, diallyl carbonate, diethylene glycol diallyl carbonate, divinylbenzene and N,N'-m-phenylene bismaleimide; said trifunctional crosslinkable monomers are selected from the group consisting of trimethylolethane tri(meth)acrylate, trimethylolpropane tri(meth)acrylate, pentaerythritol tri(meth)acrylate, tri(meth)allyl isocyanurate, tri(meth)allyl cyanurate, triallyl trimellitate and diallyl chlorendate; and said tetra-functional crosslinkable monomer is pentaerythritol tetra(meth)acrylate.

24. A composition as claimed in claim 15, wherein said inorganic filler is aluminum hydroxide or magnesium hydroxide.

* * * * *